April 29, 1969  C. O. BERRYMAN ET AL  3,441,290

VEHICLE SAFETY SYSTEM

Filed March 10, 1967

INVENTORS
CHARLES O. BERRYMAN
SIDNEY OLDBERG
WILLIAM R. CAREY

BY *Barnard, McGlynn & Reising*
ATTORNEYS 3,441,290
VEHICLE SAFETY SYSTEM
Charles O. Berryman, Detroit, Sidney Oldberg, Birmingham, and William R. Carey, Farmington, Mich., assignors to Eaton Yale & Towne Inc., Cleveland, Ohio, a corporation of Ohio
Filed Mar. 10, 1967, Ser. No. 622,348
Int. Cl. B60r 21/02
U.S. Cl. 280—150          12 Claims

ABSTRACT OF THE DISCLOSURE

An assembly for protecting an occupant of a vehicle comprising an inflatable bag, container means supported by the vehicle for storing fluid and in communication with the bag for inflating the bag, receptacle means extending into the container means for defining a chamber which is isolated from the fluid in the container means, and explosive means disposed in the receptacle means for opening the container means upon activation thereof for inflating the bag.

---

Recently, a great deal of research and development has occurred in an effort to develop safety systems for vehicles, particularly safety system for passenger vehicles such as automobiles. One safety system which is being thoroughly investigated is one utilizing an inflatable bag which is automatically inflated in response to a predetermined condition of the automobile to prevent the occupant of the automobile from contacting the instrument panel, windshield, or the like. In other words, the bag is inflated during a crash to prevent the occupant of the automobile from incurring serious injuries as a result of impact with the interior of the vehicle body.

It will be appreciated that the time in which the bag must be inflated is very critical and is measured in terms of milliseconds. Consequently, one of the problems being thoroughly researched is that relating to a means for rapidly inflating the bag. One such means which has proven satisfactory is an elongated cylindrical container for storing the pressurized fluid and including an explosive charge disposed centrally within the pressure chamber so that upon activation of the explosive charge, the container is opened to exhaust pressurized fluid into the bag for inflating the bag. Such a system has certain disadvantages, however. First, the explosive charge must be disposed within the container before the container is charged with pressurized fluid. In addition and more importantly, the reliability of the activation or detonation of the explosive charge, when exposed to pressure within the container, is significantly reduced as compared to the reliability of an explosive charge which is exposed to ambient conditions.

Accordingly, it is an object and feature of this invention to provide a safety assembly adapted to be attached to a vehicle for protecting an occupant of the vehicle and including an inflatable bag with a container means in communication with the bag to store fluid for inflating the bag and receptacle means associated with the container means for receiving and isolating an explosive means from the interior of the container means so that an explosive means may be disposed in the receptacle means after the container means has been charged with pressurized fluid and detonated for opening the container means to inflate the bag.

In general, these and other objects and features of this invention may be attained in a preferred embodiment including an inflatable bag and means for inflating the bag. The means for inflating the bag includes an inner cylindrical container having a stress riser extending therealong to predetermine the area of the opening of the inner container. A receptacle means communicates with the exterior of the inner container and extends into the inner container in a direction substantially transverse to the longitudinal axis of the inner container. An explosive charge is disposed in the receptacle means and the receptacle means is of a material which ruptures or bursts upon activation of the explosive means to allow the explosive means to open the inner container. An outer cylindrical member is disposed about the inner container and has a plurality of outlet openings spaced longitudinally therealong and disposed circumferentially in spaced relation to the stress riser of the inner container. An intermediate cylindrical member is disposed within and in spaced relationship to the outer cylindrical member to define a flow path therebetween and to control the opening of the inner container upon the activation of the explosive means. The intermediate cylindrical member has a plurality of openings extending therealong to allow fluid to flow from the inner container, the openings in the intermediate member being circumferentially aligned with the stress riser in the inner container.

Other objects and attendant advantages of the present invention will be readily appreciated as the same becomes better understood by reference to the following detailed description when considered in connection with the accompanying drawings wherein.

Figure 1:
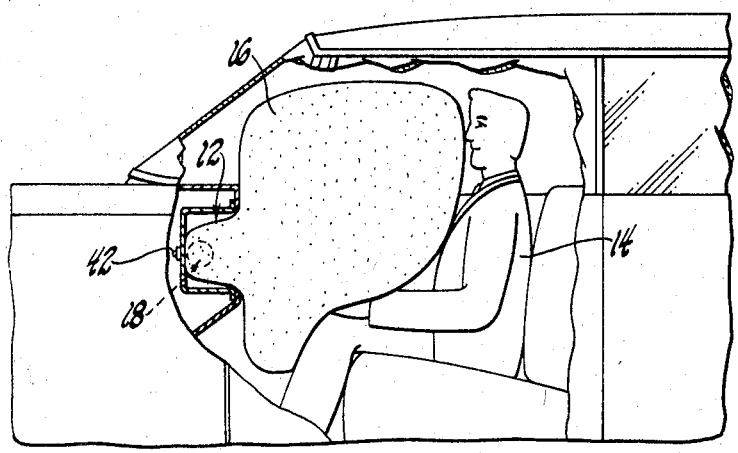
FIGURE 1 is a partially broken away fragmentary view of the assembly of the instant invention.
Figure 2:
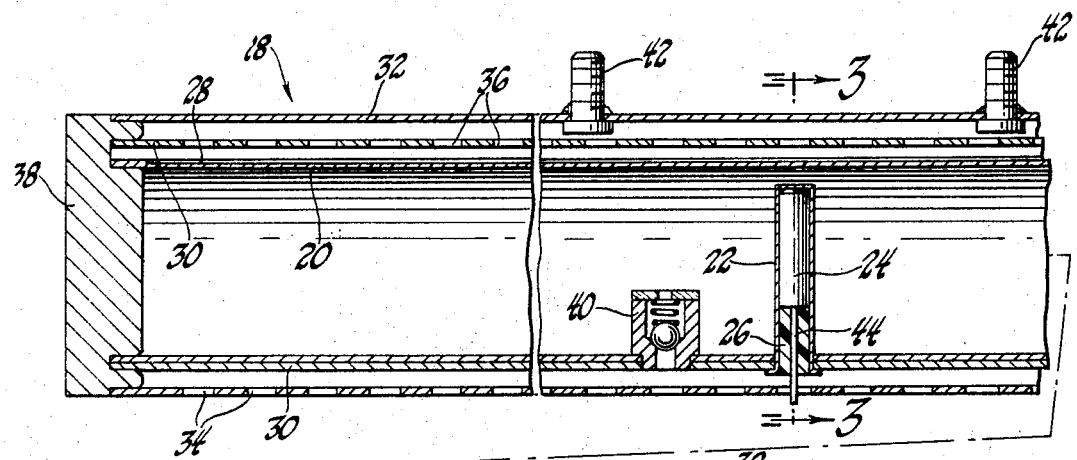
FIGURE 2 is an enlarged cross-sectional view of the fluid source utilized in the assembly of the instant invention.

Referring now to the drawings, wherein like numerals indicate like or corresponding parts throughout the several views, a vehicle is generally shown at 10 in combination with a safety assembly generally shown at 12 for protecting the occupant 14 of the vehicle.

The assembly includes an inflatable bag 16 and a fluid source, generally shown at 18. The fluid source inflates the bag 16. The bag 16 is normally stowed in a collapsed folded position and an appropriate sensing means is utilized to inflate the bag 16 in the event of a crash or any other predetermined operating condition of the vehicle so as to prevent the occupant 14 from moving forward and impacting against portions of the vehicle, such as the instrument panel and/or the windshield.

The fluid source 18 includes a container means comprising the inner cylindrical container 20 and the receptacle means 22. The inner cylindrical container 20 is in communication with the bag 16 and stores pressurized fluid for inflating the bag 16. The receptacle means 22 is associated with the container means 20 for receiving and isolating an explosive means 24 from the interior of the container means 20. More specifically, an explosive means 24 may be disposed in the receptacle means 22 and actuated for opening the container means 20 to inflate the bag 16. The receptacle means 22 extends into the interior of the inner container 20 and has an opening 26 communicating with the exterior of the inner container 20. More specifically, the receptacle means 22 extends radially into the inner container 20 in a direction substantially transverse to the longitudinal axis of the inner container 20.

The receptacle means 22 is thin walled or otherwise rupturable, burstable or frangible, so that when the explosive means 24 is disposed therein and activated, the receptacle means 22 ruptures, bursts or breaks into pieces so that the force of the explosion is applied against the inner cylindrical container 20 to open the inner cylindrical container 20. In order to facilitate the opening of the inner cylindrical container 20, a stress riser comprising the groove 28 extends therealong.

Figure 3:
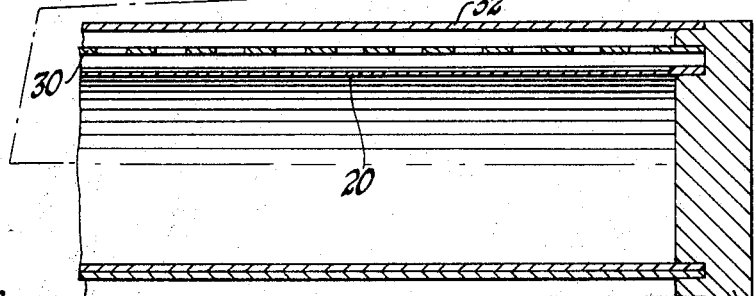
FIGURE 3 is a cross-sectional view taken substantially along line 3—3 of FIGURE 2.
Figure 3:
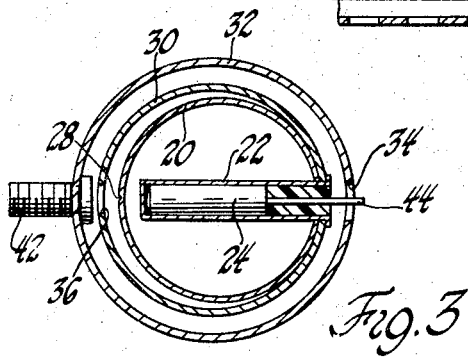

There is also included a limiting means comprising the intermediate member 30 associated with the inner container 20 for controlling the opening of the inner container 20 along the stress riser 28 when the explosive means 24 is disposed in the receptacle means 22 and activated. In other words, as best illustrated in FIGURE 3, upon activation of the explosive means 24, the inner container 20 ruptures or breaks along the stress riser 28 and in so doing the portions of the inner cylindrical container 20 adjacent the stress riser 28 move radially outward and into contact with the intermediate member 30. Thus, the intermediate member 30 limits the outward radial movement of the inner container 20 as the inner container 20 is opened as a result of the activation or detonation of the explosive means 24.

There is also included a flow control means comprising the outer member 32 which is disposed in spaced relationship to the intermediate member 30 and in spaced relationship to the inner container 20 for controlling the fluid flow from the inner container 20 to prevent the inadvertent rupture of the bag 16. In other words, if the pressurized fluid within the inner container 20 were allowed to be ejected therefrom without any control, the energy in such flow could rupture the bag 16. In the preferred embodiment, the inner container 20, the intermediate member 30, and the outer member 32 are all cylindrical. The outer cylindrical member 32 has a plurality of outlet openings 34 spaced longitudinally therealong and circumferentially spaced from the stress riser 28 of the inner container 20. The intermediate cylindrical member 30 has a plurality of openings 36 for allowing fluid to flow from the inner container 20 longitudinally therealong. The openings 32 in the intermediate member 30 are circumferentially aligned with the stress riser 28. There is also included the plug means 38 interconnecting and defining the ends of the cylindrical members 30 and 32 and the inner container 20.

There is also included means comprising the ball check valve assembly 40 for charging the inner container 20 with a pressurized fluid, although it will be understood other valves may be utilized. The bolts 42 are welded or otherwise secured to the outer cylindrical member 32 for attaching the entire assembly to a vehicle as illustrated by way of example in FIGURE 1.

The explosive means 24 is an explosive charge comprising a pyrotechnic or the like. One such explosive charge which has been found satisfactory is of the type commonly referred to as a squib. The explosive means 24 is preferably electrically actuated by a current being passed through the lead 44.

It has been found that by utilizing an inner container 20 of a cylindrical shape in combination with an explosive charge for opening the cylindrical container, a rupture of the inner container 20 occurs substantially longitudinally along the container regardless of whether or not a stress riser 28 is utilized. Thus, the stress riser 28 may be eliminated; however, the utilization of the stress riser 28 predetermines the area of rupture of the inner container 20 upon activation of the explosive means 24.

By utilizing the assembly of the instant invention, the inner container 20 may be charged with pressurized fluid through the valve 40 and at a later convenient time the explosive means 24 may be inserted into the receptacle means 22. The receptacle means 22 isolates the explosive means 24 from the pressure within the inner container 20 and thereby increases the reliability of the detonation of the explosive means 24. The assembly is installed in a vehicle, as illustrated in FIGURE 1, with the lead 44 attached to an appropriate sensing device. Any suitable sensing device may be utilized, such as an accelerometer, inertia responsive switch, or the like. An example switch is illustrated in copending application Ser. No. 562,289, filed July 1, 1966 in the names of Sidney Oldberg and William R. Carey and assigned to the assignee of the instant invention. In the event of a crash of the vehicle, the sensing means sends a signal to the explosive means 24 to detonate the explosive means 24 which in turn ruptures, bursts, or fragmentizes the receptacle 22 so that the force of the explosion is applied to the inner container 20 to open the inner container 20 along the stress riser 28. As the inner container 20 is opened, the portions thereof on either side of the stress riser 28 move radially and contact the intermediate member 30, thus assuring that the inner container 20 opens substantially along the entire length of the stress riser 28. The pressurized fluid within the inner container 20 flows out through the openings 36 in the intermediate member 30, around the intermediate member 30 and out the openings 34 in the outer member 32, and into the bag 16.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An assembly adapted to be attached to a vehicle for protecting an occupant of the vehicle, said assembly comprising an inflatable bag, container means in communication with said bag to store fluid for inflating said bag, receptacle means associated with said container means for receiving and isolating an explosive means from the interior of said container means whereby the explosive means may be disposed in said receptacle means and activated for opening said container means to inflate said bag, said receptacle means extending into the interior of said container means and having an opening communicating with the exterior of said container and limiting means associated with said container means for controlling the opening of said container means when the explosive means is disposed in said receptacle means and activated, said container means being elongated and of a generally cylindrical shape and said receptacle means extending thereinto in a direction substantially transverse to the longitudinal axis of said container means, flow control means disposed in spaced relationship to said limiting means to control fluid flow from said container means to prevent the inadvertent rupture of said bag, said container means having a stress riser extending therealong for predetermining the area of the opening of said container means, an explosive means disposed in said receptacle means, said receptacle and reservoir having a fluid tight seal therebetween preventing fluid flow from the reservoir and enabling said explosive means to be inserted into said receptacle while maintaining said seal, said flow control means comprising an outer cylindrical member having a plurality of outlet openings spaced longitudinally therealong, said outlet openings being circumferentially spaced from said stress riser of said container means, said limiting means comprising an intermediate cylindrical member disposed within and in spaced relationship to said outer cylindrical member to define a flow path therebetween, said intermediate cylindrical member having at least one opening for allowing fluid to flow therefrom, said opening being circumferentially aligned with said stress riser, and plug means defining the ends of said cylindrical members and said container means.

2. In a safety apparatus for protecting an occupant of a vehicle during a collision and which comprises an expansible occupant restraint having a collapsed inoperative condition and an expanded operative condition, a fluid reservoir for containing a supply of pressurized fluid to be directed into said restraint to effect expansion thereof, a diffuser member associated with said reservoir, said diffuser member having at least one flow passage therein for controlling fluid flow to said occupant restraint, and explosive means for effecting the formation of an opening in said reservoir to provide for flow of fluid from said reservoir to said confinement, the improvement comprising receptacle means located within said reservoir, said receptacle means defining an explosive receiving chamber communicating with an access opening which in turn communicates with the exterior of said reservoir and through which access opening said explosive means is insertable into said chamber from the exterior of said reservoir, said receptacle and reservoir having a fluid tight seal therebetween preventing fluid flow from the reservoir and enabling said explosive means to be inserted into said receptacle while maintaining said seal, an electrical conductor extending through said access opening to said explosive means, an electrical insulator positioned in said access opening and insulating said conductor from said receptacle means, said receptacle means comprising a thin-walled container which isolates said explosive means, electrical insulator and said electrical conductor from said fluid in said reservoir and which ruptures upon activation of said explosive means.

3. In a safety apparatus as defined in claim 2 further including a member interposed between said diffuser and said reservoir for controlling the configuration of the opening formed in said reservoir by said explosive means, and wherein said access opening of said receptacle means communicates with the exterior of said member.

4. In a safety apparatus as defined in claim 2 wherein said reservoir includes a fill opening providing for filling of said reservoir with fluid pressure and which fill opening is spaced from said access opening.

5. In a safety apparatus as defined in claim 2 wherein said reservoir and diffuser member comprise nested generally cylindrical members having a longitudinal axis and said receptacle means extends transverse to the longitudinal axis thereof.

6. Safety apparatus for protecting an occupant of a vehicle during a collision, said safety apparatus comprising a confinement having a collapsed inoperative condition and an expanded operative condition, said confinement when in said expanded operative condition being effective to restrain movement of an occupant of a vehicle during a collision, a reservoir for containing a supply of fluid for expanding said confinement, explosive means operable to effect the formation of an opening in said reservoir by effecting movement of at least one portion of said reservoir to provide for flow of fluid therefrom, means for controlling the configuration of the opening formed in said reservoir by restricting movement of said portion of said reservoir upon detonation of said explosive means, and receptacle means in which said explosive means is located, said receptacle means being located in said reservoir and isolating said explosive means from the interior of said reservoir and from fluid contained therein and having an opening communicating with the exterior of said reservoir, said receptacle and reservoir having a fluid tight seal therebetween preventing fluid flow from the reservoir and enabling said explosive means to be inserted into said receptacle while maintaining said seal.

7. Safety apparatus as defined in claim 6 wherein said reservoir comprises a generally elongate member having a longitudinal axis and said receptacle extends transverse to said longitudinal axis and has an opening communicating with the exterior of said reservoir.

8. An assembly adapted to be attached to a vehicle for protecting an occupant of the vehicle, said assembly comprising an inflatable confinement, container means in communication with said confinement to store fluid for inflating said confinement, explosive means for effecting the formation of an opening in said container, receptacle means associated with said container means for receiving and isolating said explosive means from the interior of said container means, said receptacle means extending into the interior of said container means and having an opening communicating with the exterior of said container means, said receptacle and reservoir having a fluid tight seal therebetween preventing fluid flow from the reservoir and enabling said explosive means to be inserted into said receptacle while maintaining said seal, said container means comprising an inner container for receiving and storing fluid and limiting means associated with said inner container for controlling the opening of said inner container when said explosive means is activated, flow control means disposed in spaced relationship to said limiting means for controlling fluid flow from said inner container to prevent the inadvertent rupture of said confinement, said flow control means comprising an outer member having at least one outlet opening therein, said limiting means comprising an intermediate member disposed in spaced relationship to said outer member to define a flow path therebetween, said intermediate member having at least one opening for fluid flow therethrough, said opening in said intermediate member being aligned with said opening formed in said container by said explosive.

9. An assembly as defined in claim 8 wherein at least a portion of said receptacle means is thin walled and ruptures when said explosive means is activated.

10. An assembly as defined in claim 8 wherein said inner container has a stress riser extending therealong for predetermining the area of the opening formed in said inner container by said explosive means.

11. An assembly as defined in claim 8 wherein said flow control means comprises an outer generally cylindrical member having a plurality of outlet openings spaced longitudinally therealong.

12. An assembly adapted to be attached to a vehicle for protecting an occupant thereof, said assembly comprising an inflatable confinement, container means in communication with said confinement to store fluid for the inflation thereof, said container means comprising an inner container for storing fluid, receptacle means extending into the interior of said inner container for receiving and isolating explosive means from the interior of said inner container, and having an opening communicating with the exterior of said inner container, explosive means disposed in said receptacle means, said receptacle and reservoir having a fluid tight seal therebetween preventing fluid flow from the reservoir and enabling said explosive means to be inserted into said receptacle while maintaining said seal, limiting means disposed in spaced relationship to said inner container for controlling the formation of an opening therein when the explosive means is activated, said inner container having means for predetermining the area of the opening therein, flow control means dipsosed in spaced relationship to said limiting means to control fluid flow from said inner container to prevent inadvertent rupture of said confinement, said flow control means comprising an outer member having a plurality of openings therein, said limiting means comprising an intermediate member disposed within and in spaced relationship to said outer member to define a flow path therebetween, said intermediate member having at least one opening for allowing fluid to flow therefrom to said flow path, and means for disposing said members and said inner container in said spaced relationship relative to each other.

References Cited

UNITED STATES PATENTS 2,850,291  9/1958  Ziccardi _____ 280—150

BENJAMIN HERSH, *Primary Examiner.*

JOEL E. SIEGEL, *Assistant Examiner.*